S. DAVIS.
VALVE.
APPLICATION FILED APR. 22, 1909.
955,948.
Patented Apr. 26, 1910.
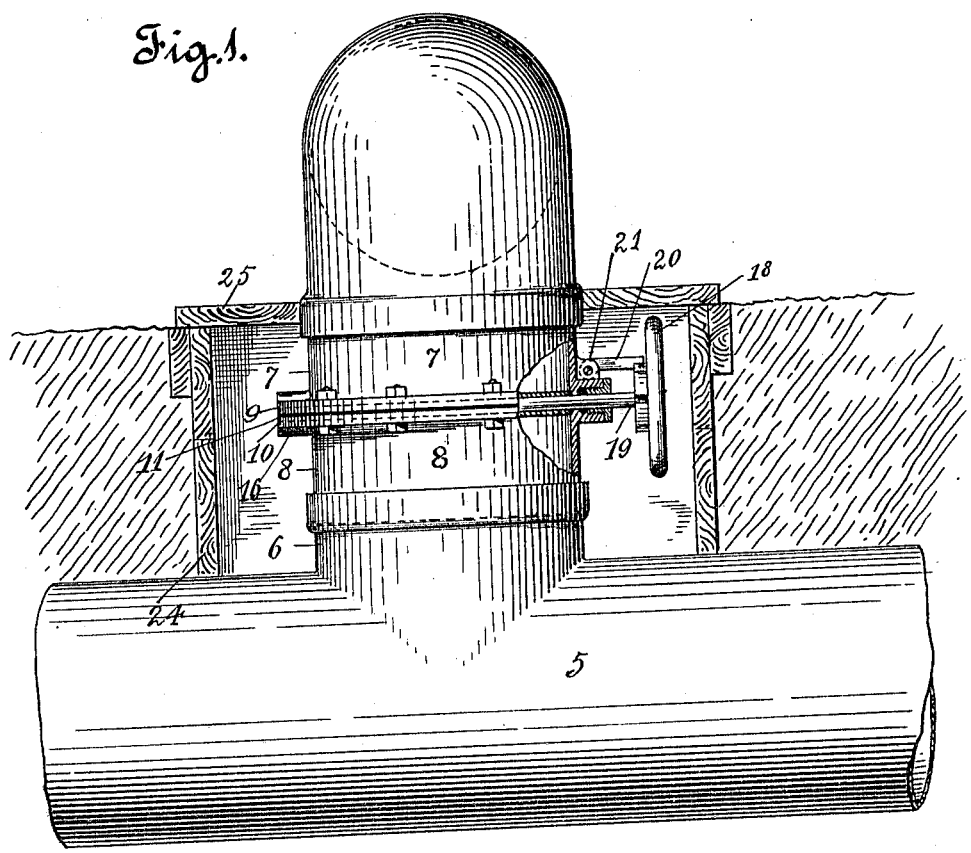
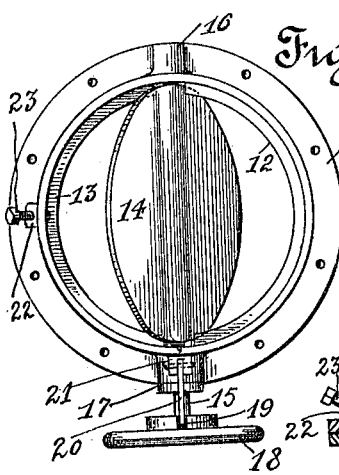
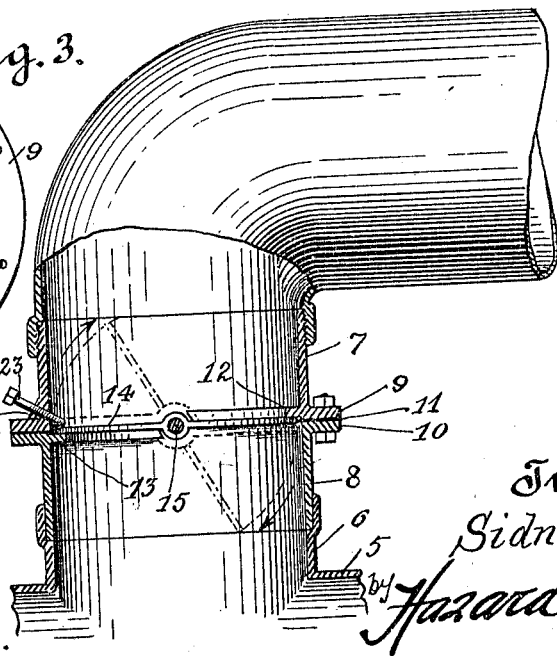
Witnesses,
Inventor,
Sidney Davis,
by Hazard & Straus
Attorney

UNITED STATES PATENT OFFICE.

SIDNEY DAVIS, OF LANKERSHIM, CALIFORNIA.

VALVE.

955,948.

Specification of Letters Patent.  Patented Apr. 26, 1910.

Application filed April 22, 1909. Serial No. 491,491.

*To all whom it may concern:*

Be it known that I, SIDNEY DAVIS, a citizen of the United States, residing at Lankershim, in the county of Los Angeles and State of California, have invented new and useful Improvements in Valves, of which the following is a specification.

My invention relates primarily to that class of valves employed in irrigation systems by which the flow of water through irrigation pipe lines and stand pipes attached thereto may be controlled, and a basic object of my invention is to provide a valve that is simple in construction, efficient in operation, and by means of which the flow of water from stand pipes and irrigation pipe lines may be readily controlled.

A further object of my invention is to provide a valve, whereby the volume of water passing through a pipe line may be accurately regulated.

I accomplish these objects by means of the device described herein and illustrated in the accompanying drawings, in which:—

Figure 1— is a side elevation of an irrigation pipe line provided with a stand pipe and equipped with my valve. Fig. 2— is a central vertical section through the stand pipe showing the valve connected thereto. Fig. 3— is a top plan view of the valve, the valve gate being shown in a partially open position.

In irrigating ranches and orchards by modern irrigation methods, various valves have been constructed for use on stand pipes of irrigating pipe lines for the purpose of controlling the flow of water therefrom. In most of these constructions no provision is made, whereby temporary pipe lines may be attached prior to opening the valve, thus necessarily wetting the operator and causing discomfort. By means of my improved valve a temporary pipe line may be attached prior to the operation of the valve, thus materially contributing to comfort and convenience of the operator.

In the embodiment of my invention, 5 designates an irrigation pipe line of usual construction, and 6 a stand pipe preferably formed integrally therewith. The valve casing is formed of cast metal and is preferably divided into an upper half 7 and a lower half 8, each provided with an external flange 9 and 10, through which bolts pass to maintain them in liquid tight relation to each other, a gasket 11, being interposed. Both halves of the valve casing are provided with semi-circular internal flanges 12 and 13, the upper and lower faces when the two halves are bolted together being slightly below the rim to provide for the horizontal disposition of the valve gate 14, the flanges forming seats for the gate. Valve gate 14 is circular in form and is journaled on a valve stem 15, one end of which is mounted in a bearing 16 formed on the external flanges of the casing. The other end of the stem passes through a stuffing box 17 located diametrically opposite bearing 16 and terminates in a handle 18. This handle is provided with a circular disk having notches 19 formed in the periphery thereof, adapted to be engaged by a latch 20 pivoted in lugs 21 formed on the flange of the upper half of the casing. By means of this latch the valve may be maintained in any desired position, efficiently controlling the volume of water passing therethrough. The external flange of the upper half of the casing is provided with a lug 22 in which is mounted a set screw 23 adapted to maintain the valve gate in a seated position when closed.

The upper end of the upper half of the valve casing is threaded externally for the reception of the lower threaded end of a metallic pipe elbow, to which the metallic pipe line (not shown) may be attached for temporary irrigation purposes at a distance from the stand pipe. This elbow may be attached to any stand pipe valve casing, doing away with the necessity of a multiplicity of elbows.

The stand pipe and gate valve are preferably placed below the surface of the ground to protect them from injury, being inclosed by a wooden box or casing 24 having a cover 25.

By forming the valve casing of complemental parts, I am enabled to quickly assemble the parts of the valve and readily replace the parts that may become worn or broken.

It will be observed that the valve may be used in various other situations, such as branch pipe lines leading from main lines, and also in sewer connections.

It will be apparent from the above description that I have provided a simple form of gate valve that will admirably subserve the functions imposed upon it in a highly efficient and satisfactory manner.

Having described my invention what I claim as new and desire to secure by Letters Patent is:—

A gate valve, comprising two cylindrical casings adapted to be rigidly secured together, the inner surface of each casing at their contacting ends being provided with a semicircular valve seat, a flat valve gate pivotally mounted between said casings, the flat surfaces of the valve gate contacting with the valve seats when the gate is in its closed position, means to lock the gate in its closed position, and means to rigidly maintain the gate from movement when in a partially opened position.

In witness that I claim the foregoing I have hereunto subscribed my name this 16th day of April, 1909.

SIDNEY DAVIS.

Witnesses:
   EDMUND A. STRAUSE,
   T. L. MEAD, Jr.